P. Quinn,

Steam Boiler.

No. 4302. Reissued Mar. 14, 1871.

Witnesses
John A. Ellis,
J. P. White

Inventor
Patrick Quinn,
per,
T. H. Alexander
Atty

N. PETERS, PHOTO-LITHOGRAPHER, WASHINGTON, D. C.

UNITED STATES PATENT OFFICE.

PATRICK QUINN, OF SOUTH NEWMARKET, NEW HAMPSHIRE.

IMPROVEMENT IN STEAM-BOILERS.

Specification forming part of Letters Patent No. 110,158, dated December 13, 1870; Reissue No. 4,302, dated March 14, 1871.

*To all whom it may concern:*

Be it known that I, PATRICK QUINN, of South Newmarket, in the county of Rockingham and State of New Hampshire, have invented certain new and useful Improvements in Steam-Boilers; and I do hereby declare that the following is a full, clear, and exact description thereof, reference being had to the accompanying drawings, and to the letters of reference marked thereon, which form a part of this specification.

The nature of my invention consists in the construction and arrangement of a steam-boiler, as will be hereinafter fully set forth.

In order to enable others skilled in the art to which my invention appertains to make and use the same, I will now proceed to describe its construction and operation, referring to the annexed drawings, in which—

Figure 1:
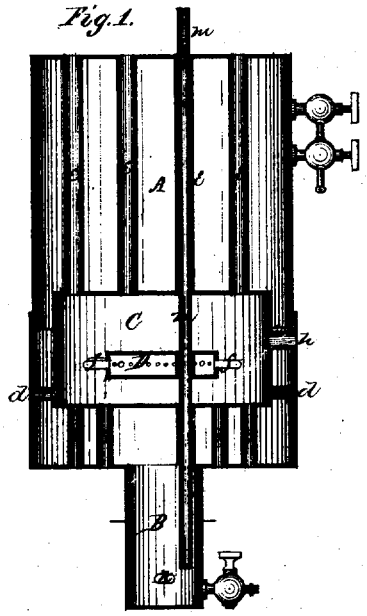
Figure 2:
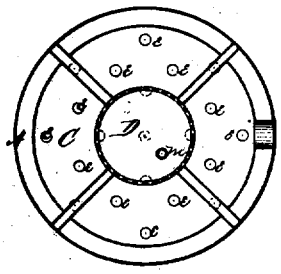
Figure 3:
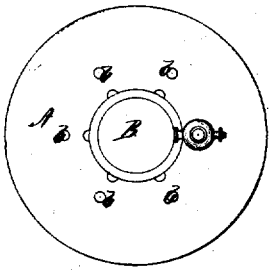

Figure 1 is a vertical longitudinal section of my boiler. Fig. 2 is a horizontal section through line *x y*, Fig. 1; and Fig. 3 is a bottom view.

A represents the shell of my boiler, provided in the center of its bottom with a downward-projecting chamber, B, which I denominate a "mud-receiver."

It will be understood that the boiler rests upon and is surrounded by brick-work for a suitable height, the grate being located at about the point *a a* on the mud-receiver and the flames surrounding the lower end of the boiler.

At a suitable point within the boiler A is located the combustion-chamber C, to which the flames have access from the fire-chamber through the vertical tubes *b b* and the horizontal tubes *d d*, the heat then rising through other vertical tubes, *e e*. The tubes *b b* connect the combustion-chamber through the lower part of the boiler with the fire-chamber, and the tubes *d d* pass through the sides of the boiler. The tubes *e e* pass upward from the combustion-chamber through the upper part of the boiler.

In the center of the combustion-chamber is placed a hollow drum, D, with four arms or pipes, *f f*, passing through from the outside through four tubes set for that purpose, similar to the tubes *d d*. This hollow drum is perforated all around, and air is forced into the same through the arms *f f* by any suitable means. This air will become heated and go through the perforations, producing perfect combustion, igniting and consuming the smoke and gases rising from the fire-chamber. Through the side of the boiler there is also a large opening, *h*, into the combustion-chamber, so that a man can enter the same for repairs. On the side of the mud-receiver, under the grates, is also a man-hole, *k*, for cleaning purposes.

*m* is the feed-water pipe, which passes through the entire boiler and combustion-chamber through one of the vertical tubes *e* down to near the bottom of the mud-receiver B. In its downward passage from top to bottom of the boiler the feed-water in the pipe *m* becomes sufficiently heated to disengage all sediment and impurities, which at once settle in the mud-receiver, while the pure water rises in the boiler and is converted into steam.

Having thus fully described my invention, what I claim as new, and desire to secure by Letters Patent, is—

1. A combustion-chamber placed between ubes in a tubular upright boiler, and having he flames admitted into it both through the bottom and sides of the boiler, substantially as herein set forth.

2. A hollow perforated drum or its equivalent, provided with hollow arms or pipes and placed within the combustion-chamber of a steam-boiler, the hollow arms or pipes communicating with the outside air, substantially as and for the purposes herein set forth.

3. The feed-water pipe *m*, inclosed within one of the vertical tubes *e*, so arranged as to conduct the feed-water through the boiler and combustion-chamber and deliver at the bottom of the boiler.

In testimony that I claim the foregoing as my own I affix my signature in presence of two witnesses.

PATRICK QUINN.

Witnesses:

PATRICK H. QUINN,
JOHN MCMANUS.